Figure 1:
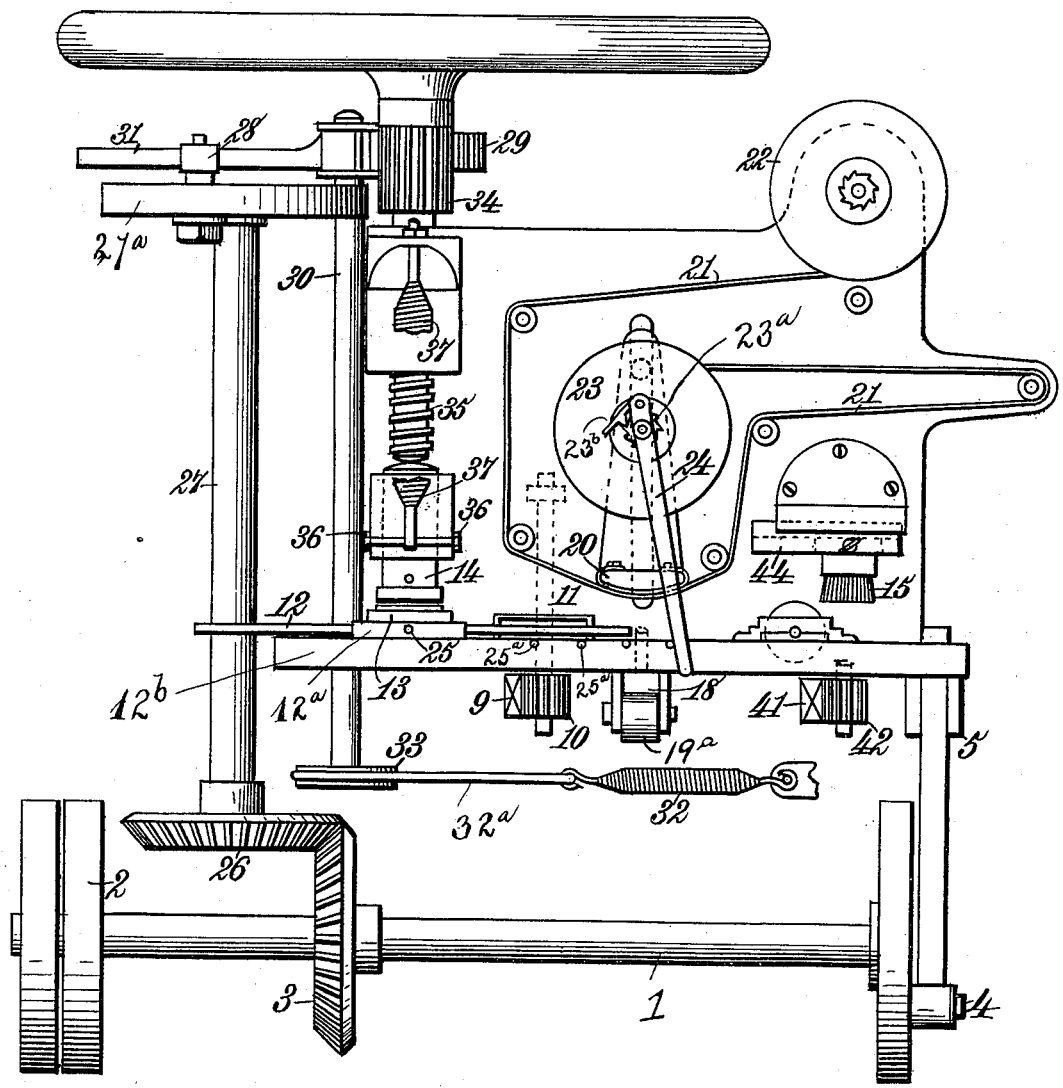

No. 640,041. Patented Dec. 26, 1899.
R. F. SPROULE.
STAMPING PRESS.
(Application filed Aug. 19, 1899.)

(No Model.) 3 Sheets—Sheet 1.

Witnesses.
Robert Everett,

Inventor,
Robert F. Sproule,
By James L. Norris,
Atty.

No. 640,041. Patented Dec. 26, 1899.
R. F. SPROULE.
STAMPING PRESS.
(Application filed Aug. 19, 1899.)
(No Model.) 3 Sheets—Sheet 2.
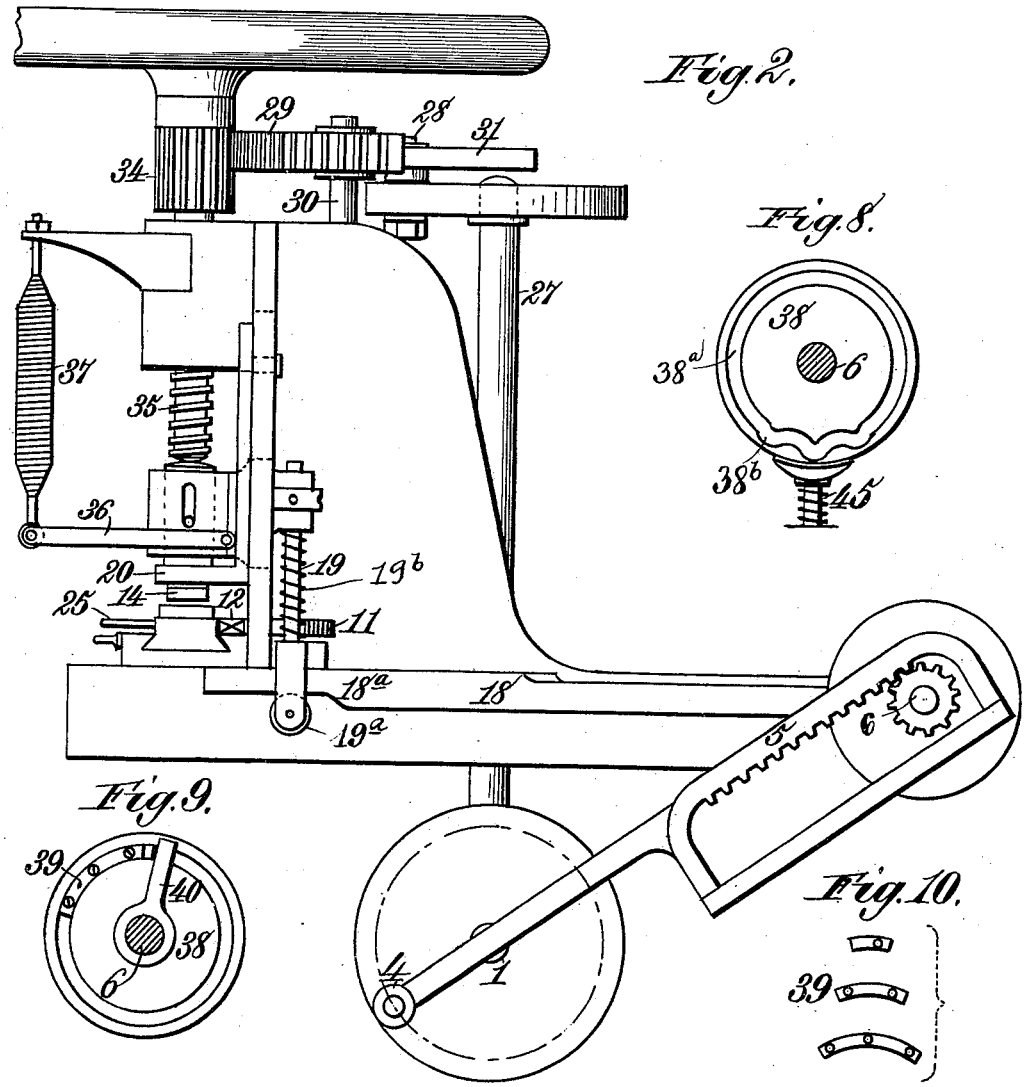
Witnesses.
Robert Everett
Inventor,
Robert F. Sproule,
By James L. Norris,
Att'y.

No. 640,041. Patented Dec. 26, 1899.
R. F. SPROULE.
STAMPING PRESS.
(Application filed Aug. 19, 1899.)
(No Model.) 3 Sheets—Sheet 3.
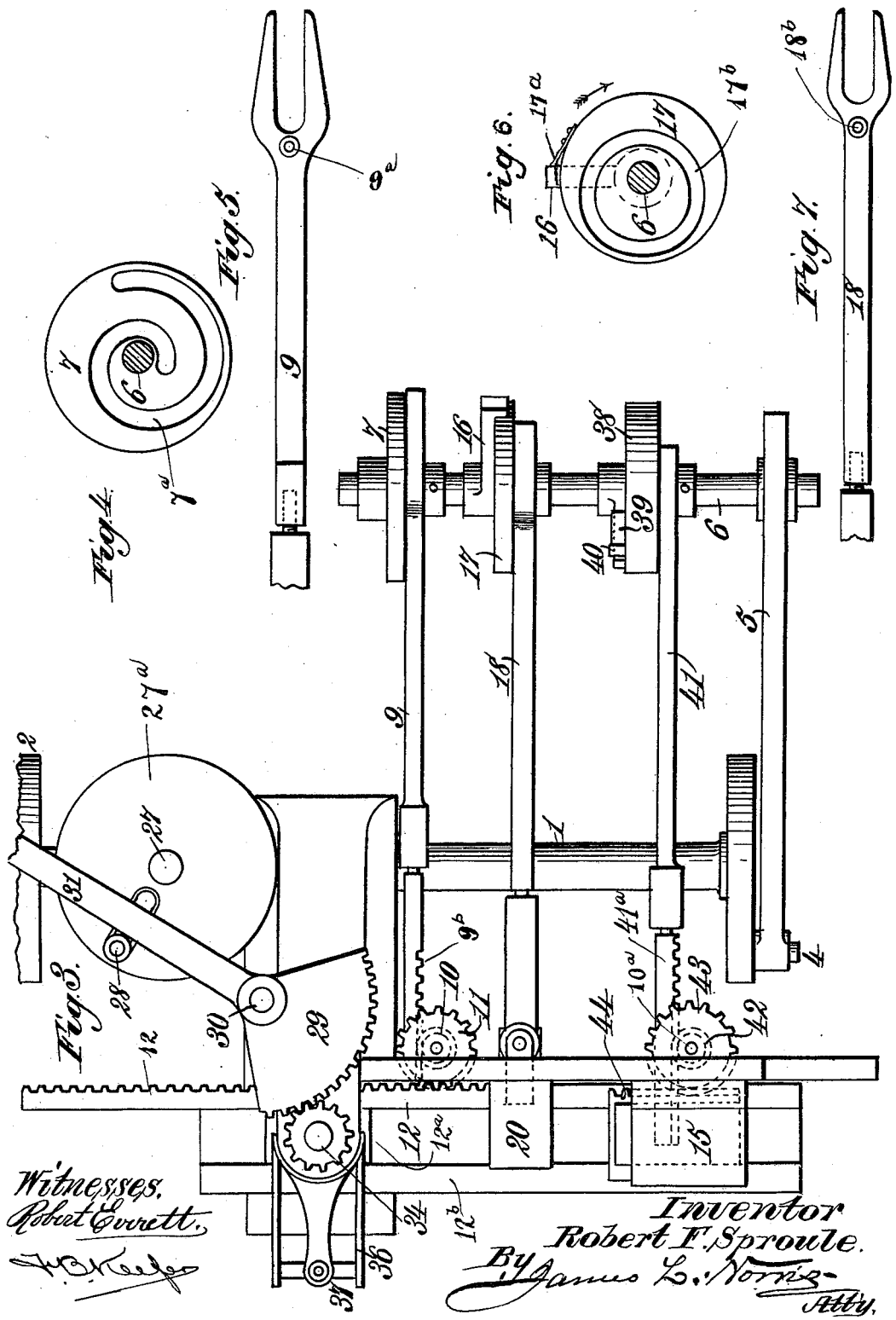
Witnesses
Robert Everett
F. B. Keefe
Inventor
Robert F. Sproule.
By James L. Norris
Atty.

UNITED STATES PATENT OFFICE.

ROBERT FRITH SPROULE, OF LONDON, ENGLAND.

STAMPING-PRESS.

SPECIFICATION forming part of Letters Patent No. 640,041, dated December 26, 1899.

Application filed August 19, 1899. Serial No. 727,838. (No model.)

*To all whom it may concern:*

Be it known that I, ROBERT FRITH SPROULE, engineer, a citizen of England, residing at No. 205 Uxbridge road, London, England, have invented certain new and useful Improvements in Relief-Color-Stamping Presses, (for which I have applied for a patent in Great Britain, dated January 24, 1899, No. 1,690,) of which the following is a specification.

My invention relates to stamping-presses of the kind in which a reciprocating screw moves an upper die up and down, while a reciprocating table moves the lower die under a color-brush and wiper and then under the upper die to receive an impression on paper or other material placed on the lower die. The wiper, which clears pigment off the face of the die, is usually a strip of paper moved along under a pad, while the lower die passes under it. According to my present invention I give this pad a vertically-reciprocating movement, by which it is raised clear of the die during its return stroke and is depressed, so as to wipe the face of the die only after the die has received pigment and is making its stroke to the position for impression. I move the table by a rack and reciprocating pinion, to which I give motion from a reciprocating cam.

For moving the screw of the press I cause a toothed segment, which gears with a deep pinion on the screw, to reciprocate by means of a crank-pin with roller revolving against an arm of the segment, so that the screw receives a gradual motion at the starting of its stroke and a more rapid motion afterward, the shock of starting the screw being thus greatly reduced. I fit the plunger which carries the upper die in a sleeve, urging it upward by a spring, which I can adjust to greater or less tension, thus varying the force of the impression. I also move the color-brush by a reciprocating cam having several ridges and furrows which has the effect of moving the brush several times backward and forward over the die, and I make this cam adjustable in position and motion, so as to bring one, two, or more of its ridges into action, according as the die requires to be brushed over by the color-brush once, twice, or a greater number of times.

The accompanying drawings show portions of a relief-color-stamping press embodying the improvements above mentioned.

Figure 1 is a front view, Fig. 2 is a side view, and Fig. 3 is a plan, the lower framing, which is of any ordinary construction, being omitted in order that the working parts may be more clearly shown. Fig. 4 is a front view of the cam for moving the table to and fro, and Fig. 5 shows its forked rod. Fig. 6 is a front view of the cam for moving the wiper up and down, and Fig. 7 shows its forked rod. Fig. 8 is a front view, and Fig. 9 is a back view, of the cam for moving the color-brush. Fig. 10 shows pieces for varying the stroke of the cam.

1 is the main shaft, which is journaled in suitable bearings (not shown) and has on it fast and loose pulleys 2, a bevel-wheel 3, and a crank-disk having crank-pin 4, which by means of a rack 5 gives reciprocating rotation to a pinion and shaft 6. On this shaft is fixed a disk 7, having in it a cam-path $7^a$, in which is engaged a roller $9^a$, mounted on a forked rod 9, the path being made with a long dwell. The forked rod 9 has on it a rack $9^b$, gearing with a pinion 10 on a vertical shaft, which has on it another pinion 11, gearing with a rack 12, attached to the table $12^a$, which is thus caused to move to and fro, bringing the die 13 from its position under the upper die 14 to its position under the color or ink brush 15, in which latter position it is held stationary by the long dwell of the cam-path $7^a$ while it is brushed over a less or greater number of times. The reciprocating shaft 6 has fixed on it an arm 16, which when the arm makes its stroke in the direction of the arrow, Fig. 6, meets a spring $17^a$ on a disk 17 and so turns the disk; but in its return stroke it passes over the spring without turning the disk. A cam-groove $17^b$ in the disk 17 acts on a roller $18^b$, mounted on a forked rod 18. As this rod is caused to move to and fro an inclined shoulder $18^a$ on its under side acts upon a roller $19^a$, mounted on a rod 19, which is urged upward by a spring $19^b$ and is attached to a vertically-movable slide 20, composed of an L-shaped or angle bar, under which passes the wiping-strip 21, of paper, for wiping the die 13 after it has received color or ink from the brush 15. The movement of the slide 20 is so timed that the paper wiping-strip is raised clear above the die 13 as it is passing toward the brush 15, but is depressed so as to wipe the die as it returns to the stamping position. The paper wiping-strip is unwound from a reel 22 onto a reel 23, which has on it a ratchet-wheel 23ª, turned step by step by a pawl 23ᵇ, pivoted on a lever 24, which is moved at every stroke of the table by a pin 25 therein, its back stroke being limited by a pin inserted in one or other of several holes 25ª in the edge of the table-guide 12ᵇ, so as to vary the stroke of the lever 24.

The bevel-wheel 3, gearing with a wheel 26, drives a vertical shaft 27, carrying at its top a disk 27ª, on which is mounted a roller 28, its axis being held in a slotted hole of the disk, so that it can be set nearer to or farther from the axis. A toothed segment 29, fixed on a vertical spindle 30, has an arm 31, which is pressed against the roller 28 by a spring 32, drawing a cord or chain 32ª, wound on a pulley 33 on the lower end of the spindle 30. The segment 29 gears with a deep pinion 34, fixed on the top of the press-screw 35. As the disk, with its roller 28, continuously revolves the segment 29 is caused to reciprocate, giving reciprocating rotation to the press-screw 35, the extent of this rotation being varied by varying the eccentricity of the roller 28. The upper die 14 is raised by a forked lever 36 and adjustable spring 37 when the press-screw 35 rises and is forced down when the press-screw descends upon it.

For moving the color-brush 15 I employ the cam-disk 38, a groove 38ª, constructed with several ridges or furrows 38ᵇ, receiving a roller mounted on a rod 41. The back of the disk has a circular groove made to receive one or other of the filling-pieces 39, (shown in Fig. 10,) these filling-pieces being made of such width that when they are held in the groove by a screw they project beyond its rear face in the path of an arm 40, which is fixed on the reciprocating shaft 6. When the short filling-piece is in the groove, then the arm 40 in making its forward-and-backward stroke through one revolution moves the disk 38 through a very small part of a revolution, not enough for any of the ridges or furrows of the cam to act upon the rod 41; but when one of the longer filling-pieces is fixed in the groove then the arm 40 moves the disk 38 to and fro through a greater part of a revolution, thus bringing one, two, or more of the ridges and furrows to act on the rod 41, giving it a to-and-fro reciprocating motion. A rack 41ª on this rod gears with a pinion 42 on a vertical shaft 10ª, a wheel 43 on which gears with a rack on the side of the slide 44, which carries the brush 15 in a slide which can be adjusted in position and held by a setting-screw. Thus according as a short or long one of the filling-pieces 39 is held in the rear groove of the disk 38 the brush 15 is caused to reciprocate a greater or less number of times over the die.

In order to prevent the disk 38 from moving except when the arm 40 meets either end of the filling-piece 39, a brake-block 45 is pressed by a spring against the edge of the disk.

Having thus described the nature of this invention and the best means I know of carrying the same into practical effect, I claim—

1. In a relief-color-stamping press, the combination with the lower die, of a table carrying said die and having a rack, a shaft having a pinion engaging said rack to reciprocate the table and die, a shaft having a cam, connections between the cam and said pinion-carrying shaft to turn the pinion and actuate the rack, a slide carrying a color or ink brush, means for actuating said slide and brush when the lower die is moved to a position under the brush, an upper die, a plunger carrying the upper die, a spring for urging the plunger upward, a press-screw for operating the plunger, a pinion on the press-screw, a segment engaging the pinion on said press-screw, and means for reciprocating the segment, substantially as described.

2. In a relief-color-stamping press for the purpose of raising and lowering the wiping-strip the combination of the driving-shaft 1, the crank-disk 4 thereon, the rack 5, pinion and shaft 6, arm 16, pawl and disk-cam 17, rod 18 and its inclined shoulder 18ª the rod and spring 19 and vertical slide 20, substantially as described.

3. In a relief-color-stamping press, the combination of a lower die, a table carrying said die and having a rack, a shaft having two pinions, one of which engages the table-rack, a rod having a rack engaging the other pinion of said shaft, a rock-shaft having a pinion, a cam secured to the rock-shaft and actuating said rod, a rack engaging the pinion on said rock-shaft, a drive-shaft, and a crank-disk secured to the drive-shaft and connected with the rack which engages the pinion on said rock-shaft, substantially as described.

4. In a relief-color-stamping press, for the purpose of giving reciprocating rotation to the screw the combination of the driving-shaft 1, the bevel-wheel 3 thereon, the bevel-wheel 26, a vertical shaft 27, adjustable crank-pin roller 28, arm 31, segment 29 gearing with deep pinion 34 on press-screw 35, also spindle 30, pulley 33 thereon, cord or chain and spring 32, substantially as described.

In testimony whereof I have hereunto set my hand in presence of two subscribing witnesses.

ROBERT FRITH SPROULE.

Witnesses:
 FRED C. HARRIS,
 GERALD L. SMITH.